(12) United States Patent
Chiang

(10) Patent No.: US 8,127,995 B2
(45) Date of Patent: *Mar. 6, 2012

(54) FILTER-FREE PROJECTOR

(76) Inventor: Kuo-Ching Chiang, Taipei County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/954,687

(22) Filed: Nov. 26, 2010

(65) Prior Publication Data

US 2011/0090466 A1  Apr. 21, 2011

Related U.S. Application Data

(63) Continuation of application No. 11/783,551, filed on Apr. 10, 2007, now Pat. No. 7,874,486.

(51) Int. Cl.
*G06K 7/10* (2006.01)

(52) U.S. Cl. .................................. 235/472.02; 455/566

(58) Field of Classification Search ............. 235/472.01, 235/472.02; 455/566; 345/690
See application file for complete search history.

(56) References Cited

U.S. PATENT DOCUMENTS

| 7,050,035 B2 * | 5/2006 | Iisaka ............................. 345/99 |
| 7,724,247 B2 * | 5/2010 | Yamazaki et al. ............ 345/207 |

* cited by examiner

*Primary Examiner* — Jamara Franklin
(74) *Attorney, Agent, or Firm* — Ching Feng Yeh; Huntington IP Consulting Co., Ltd.

(57) ABSTRACT

A filter-free projector includes a light source unit to generate light beam with different color and a color control module couple to the light source unit for switching the light source unit to emit one color light at a time. A digital mirror device panel having a plurality of mirror elements is provided so as to reflect light fed from the light source unit. Projection lens is positioned in the reflected light path from the digital mirror device panel to project image.

13 Claims, 5 Drawing Sheets

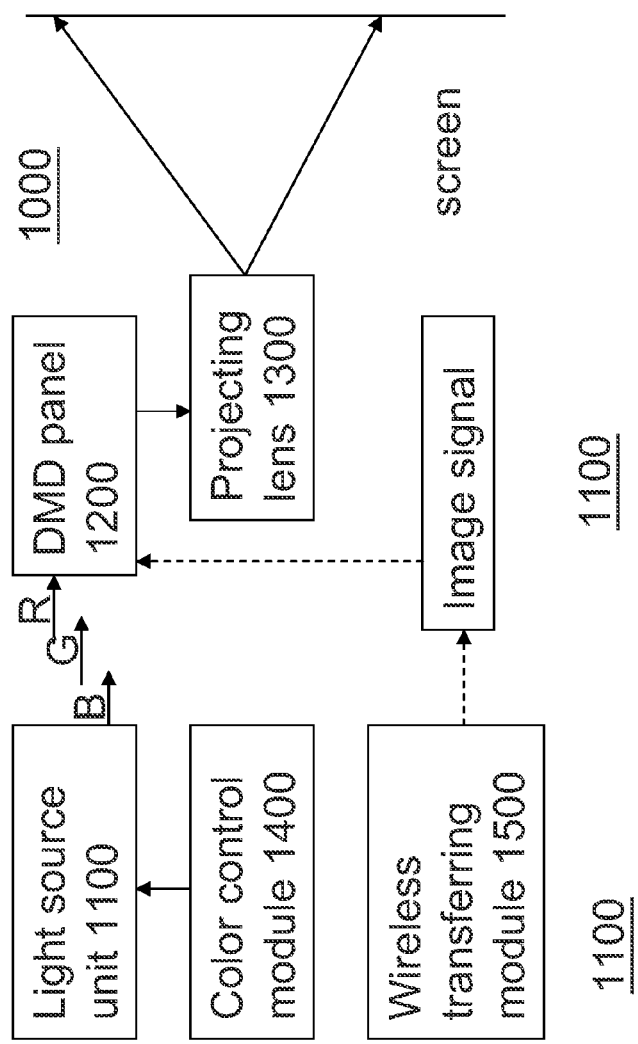
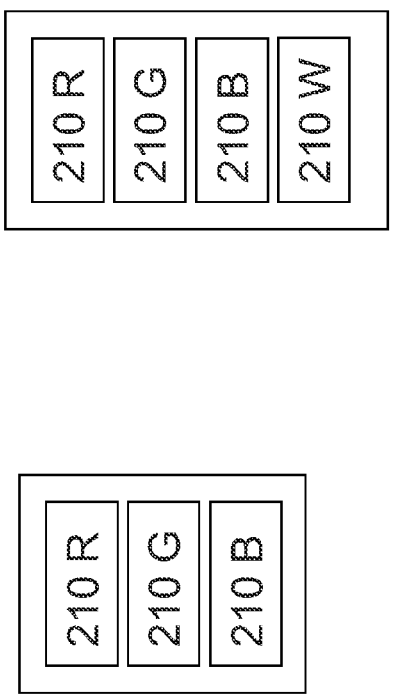

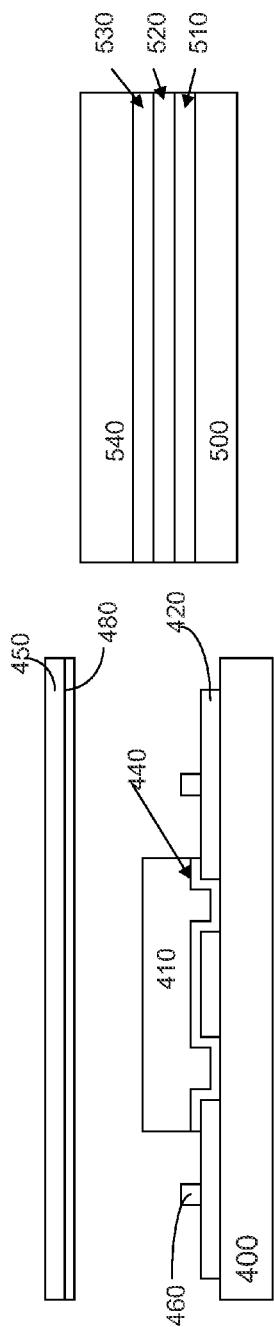
FIGURE 4
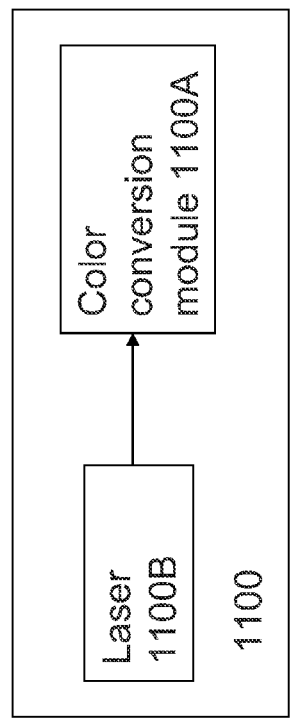
Figure 1A
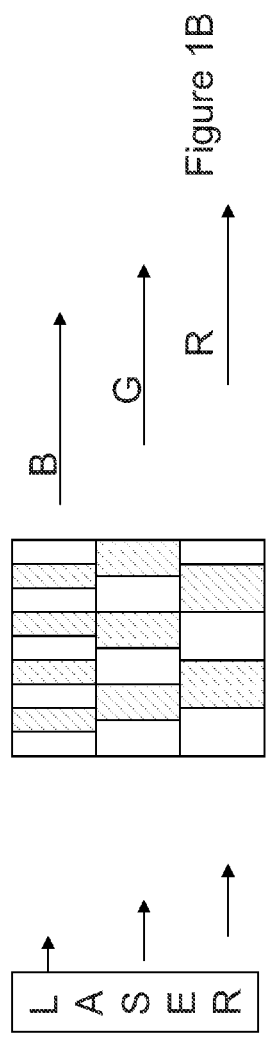
FIGURE 3
Figure 1B

FILTER-FREE PROJECTOR

CROSS REFERENCE

The application is a continue application of a pending U.S. patent application Ser. No. 11/783,551, filed on Apr. 10, 2007, which is incorporated herein by reference in its entirety.

TECHNICAL FIELD

The present invention relates generally to a projecting module and more particularly to a filter free projecting module for portable device or a stand alone projector.

BACKGROUND OF THE RELATED ART

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephone has been greatly reduced and become affordable to lots of people. It is common that a person owns more than one cellular phone. Some people even replace their cellular telephones as often as they replace their clothes or hairstyle. The cellular manufactures have to release new models with different appearances, function and styles more frequently so as to attract the attention of the buyer and occupy a favorable marketing share. Furthermore, the conventional projector employ white light lamp as a light source, therefore, at least two reflector lens and at least three light-split lens are required to split the white light into three colors (red, green and blue).

The optical lens set is expensive. The mechanism of the optical system is too complicated and the size can not be reduced. Further, the lamp source will generate heat with high temperature. Another type projector is called digital light projector, U.S. Pat. Nos. 6,733,137, 6,988,808 disclose such projector. The type of projector employs DMD (digital micro-mirror device) and a color wheel for projecting. The digital mirror device has several hundreds of thousand of mirror elements and it is capable of reducing a difference in chromaticness (tint) caused by performance/characteristic variation between filters or between light sources. A driving unit controls an inclination of each of mirror elements of a DMD panel according to a corrected video signal and a revolution state of a color filter wheel and wherein the correcting unit corrects luminance signal for each color of video signals by calculating a relative intensity of light having passed through each filter making up the color filter wheel using the output of a photosensor occurring when each mirror element of the DMD panel is put in the OFF state.

The color filter wheel is driven by a motor and it's size is not small, consequently, it is unlikely to embedded the projecting device into a portable device. Further, the conventional technical employs white light as the light source and it generates high temperature heat during operation. The projector needs a lot of lens to cooperate with the light source and the color filter wheel as well. Low-frequency flashing effect will occurs due to the white light passing through the high speed revolution color wheel which is driven by the motor. As recognized herein, for portability, it is desirable to configure the projector to be as slim as possible. But the goal of size reduction is frustrated by the present of the elements mentioned above.

SUMMARY

The object of the present invention is to provide a filter free projector (FFP) with color light source.

The filter-free projector comprises a light source unit to generate light beam with different color; a color control module couple to the light source unit for switching the light source unit to emit one color light at a time; a digital mirror device panel having a plurality of mirror elements each being controlled so as to reflect light fed from the light source unit; projection lens positioned in the reflected light path from the digital mirror device panel to project image. The light source unit includes organic electroluminescence element, LED element, field emitting element laser diode or electroluminescence element to emit illumination of red, green, or blue. The filter free projector maybe embedded into a portable device including cellular, notebook, GPS, PDA, game player, media player, video camera or still camera.

FIG. 1 shows a diagram of a projector and FIG. 1A, 1B show the diagram of the color light source unit according to the present invention.

FIG. 2 shows a diagram of a color light source unit according to the present invention.

FIG. 3 shows a diagram of field emitting device according to the present invention.

FIG. 4 shows a diagram of EL emitting source according to the present invention.

DETAILED DESCRIPTION

Figure 5:
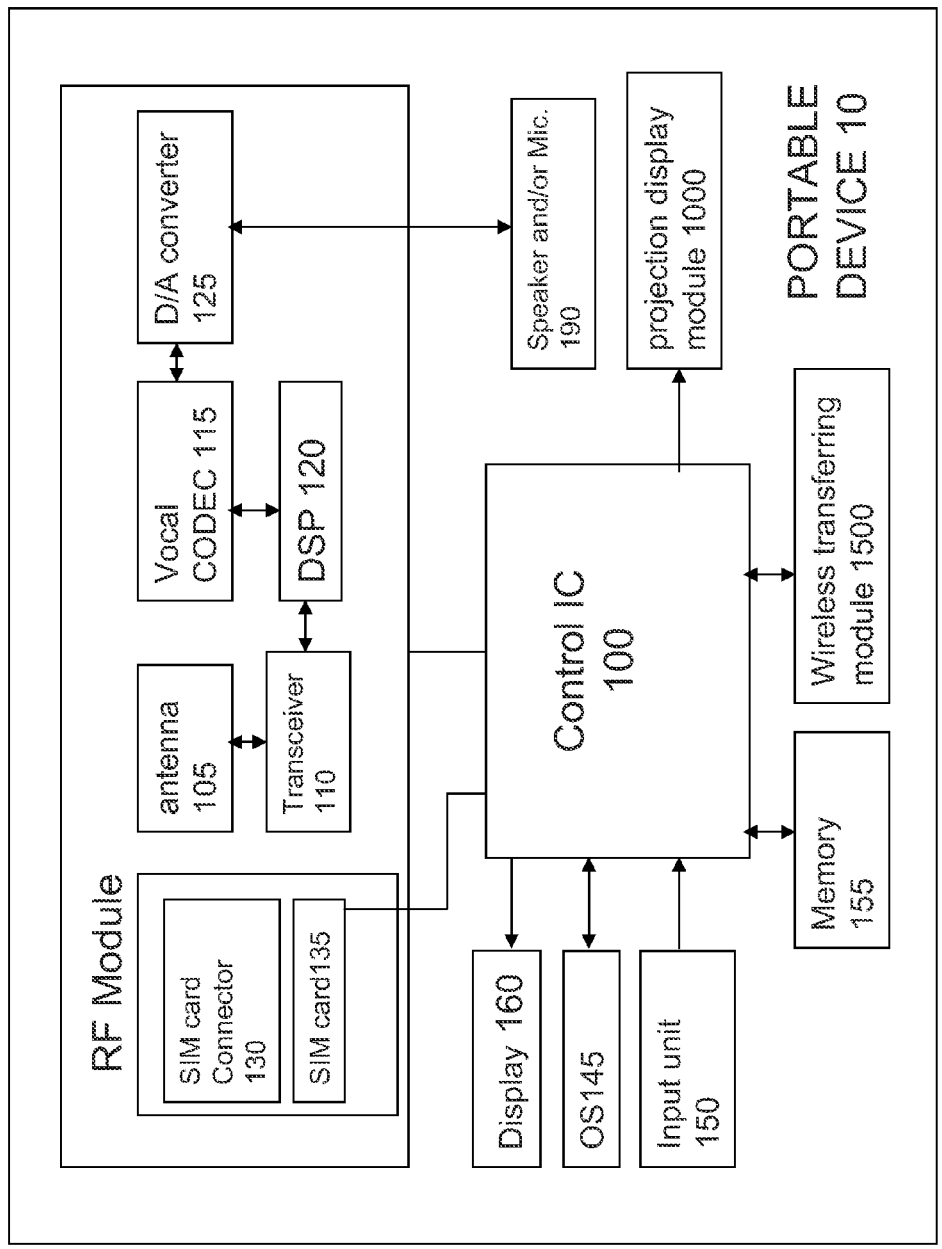
FIG. 5 shows a diagram of a mobile phone with projector according to the present invention.

The present invention relates generally to a projecting module for portable terminal or stand alone projector. The portable terminal includes but not limited to cellular phone, PDA (personal digital assistant), smart phone, notebook, medium player (MP3, MP4), GPS and the equivalent thereof.

FIG. 1 is a diagram illustrating main components of a filter free projector using a DMD (Digital Micro-mirror Device) panel according to an embodiment of the present invention. The filter free projector 1000 of the embodiment, as shown in FIG. 1, includes a light source unit 1100, a DMD panel 1200, and projection lens 1300. Some elements (such as lens amplifier, converter, correcting section and driving section) may be necessary. In one embodiment, lens amplifier may be located between the light source unit 1100 and the DMD panel 1200. However, they are not the feature of the present invention, thus the description is omitted. In the embodiment, the DMD panel 1200 includes a plurality of micro-mirror elements (not shown) and controlled by the driving section.

The driving section produces image light to be projected onto the screen and the inclination state of each of the mirror elements (not shown) is according to a switching state of the color light source state. The light source unit 1100 may emit mono-light with red, green or blue, respectively. A color control module 1400 is coupled to the light source unit 1110 to determine which color of light will be emitted. The signal to be fed in from the correcting section and the inclination state of each of the mirror elements is cooperated with the alternation state of the color light source unit 1100. The color control module 1400 is employed to switching the colors and it may be formed by integrated circuits. The switching frequency should be higher than the one of the image signal.

The switching time of the color is far faster than the wheel of the prior art. It reduces time required for switching colors in the color wheel of prior art. The switching of the color light unit causes the light to be emitted in order of the red, blue, and green colors and the switched light is output to DMD panel 1200. Preferably, the color control module 1400 make the light source unit 1100 to emit the read, blue and green color light with sequence and repeat. The order of the color can be altered. The color light source unit 1100 has plural color segments and if desired for brightness white segment. Preferably, the unit 1100 includes red color segment, followed by green segment, which in turn is followed by blue segment. In order increase image brightness, each blue segment may be followed by a white segment. The DMD 1200 receives an input signal with a gray scale signal used to control an inclination of each of the mirror elements according to a gray scale of each video signal. Thus, each frame of gray scale image will be reflected with the R, G, B colors one by one. Thus, the switching frequency of the sequence light color control module is higher than the frequency of the video signal. Namely, the frequency of the each color light is at least triple times of the one of the video signal. If four colors are employed, then, the frequency will be four times. The multiple frequency of the color control module will make sure each frame of the image will be processed with R, G, B.

The light source unit 1100 insides electrical discharge lamps such as metal halide lamps, or halogen lamps, could be used in the light source unit. In preferable embodiment, please refer to FIG. 2, the filter free projector comprises three light emitting sources 210R, 210G, and 210B is employed and positioned in correspondence with the DMD 1200, respectively. In one embodiment, the light emitting sources 210R, 210G, and 210B are organic EL (electroluminescence) elements. These organic EL elements are electric-field light emitting thin films that capable of emission of red, green, and blue light. The DMD 1200 is positioned on the light-incidence side. The projection lens 1300 could be made up of a plurality of lenses. Thus, the data or file stored in the memory of the device or external device can be projected on a screen or wall. It allows the user to project the image, game or file on an external screen. The EL element is small, flat form, light weight, therefore, it allows the small projection to be integrated in the portable device. The light source unit can be formed by three mono-light EL devices or a single EL device which may emit three mono-lights. In another case, the unit 1100 may include light emitting sources 210W for emitting white light. The light emitting source may be made of thin film, and therefore it can be embedded into the portable device.

The digital mirror device panel having a plurality of mirror elements each being controlled so as to be put in a first inclination state and in a second inclination state and reflecting light fed from the light source unit and switched by the control module while being put in the first inclination state. A driving unit is used to control so as to put each of the mirror elements in the digital mirror device panel in the first inclination state or the second inclination state according to a corresponding video signal and a switching state of the color control unit. A correcting unit is used to receive a video signal and the voltage obtained by photoelectric conversion device, to correct the video signal, based on the received voltage and to output the corrected video signal to the driving unit. The color control module 1400 is configured to include a red, a green and a blue color light source for making image light of the plurality of colors. As know in the art, the projector may include digital signal processor mounted on a DLP circuits board. However, it is not the feature of the present invention, the description is therefore omitted.

Alternatively, another embodiment of light source is shown in FIG. 4, it is a cross-sectional view of the field emission device (FED) according to the embodiment of the present invention. As seen in FIG. 3, a transparent substrate 400 is provided and transparent electrodes 420 are formed on the glass substrate 400. The transparent electrodes 420 may be made of indium tin oxide (ITO) and may be used as the emitter electrodes. Stacked gate 410 that cover a portion of the transparent electrodes 420 are formed on the glass substrate 400. Emitters 460 that emit electrons are formed on a portion of the transparent electrode 420. Each stacked gate 410 includes a mask layer 440 that covers a portion of the transparent electrodes, and is formed by UV photolithograph mask.

The mask layer 440 is preferably transparent to visible light, but opaque to ultra violet rays and can be made of an amorphous silicon layer. The silicon layer will be transparent when the thickness is thin enough. A stacked gate 410 structure includes first insulating layer/a gate electrode/a second insulating layer/focus gate electrode, sequentially formed over the substrate. The gate insulating layer is preferably a silicon oxide thin film with a thickness of 2 mu·m or more and the gate electrode is made of chrome with a thickness of about 0.25 mu·m. The gate electrode is used for extracting an electron beam from the emitter. The focus gate electrode performs as a collector for collecting electrons emitted from emitter so that the electrons can reach a fluorescent film 480 disposed above the emitter 460. If the device is used for display, the substrate can be silicon or transparent substrate.

Referring to FIG. 3, a front panel 450 is disposed upward and above the stacked gate. A variety of visual images are displayed on the front panel 450. A fluorescent film 480 is attached to a bottom surface of the front panel 450 that faces the stacked gate and a direct current voltage is applied to the fluorescent film 480 to emit color for display. The fluorescent substance may emit color light by mixing the emitted light if the thin film with R, G, B fluorescent substances. Preferably, the present invention includes three such emission displays that separately display image in red components, green components, and blue component (namely, red, green and blue images). The fluorescent substances emit red, green, and blue visible light when excited by the electron beam is evenly distributed on the fluorescent film 480. Spacer separating the front panel 450 from the stacked gate is a black matrix layer and is not shown for convenience. Due to the thin film display if formed with thinner thick and the power consumption is lower than LCD, the present invention may provide smaller size, lighter weight device. The life of battery may last longer. The field emission device does not require complicated, power-consuming back lights and filters which are necessary for LCD.

Moreover, the device does not require large arrays of thin film transistors, and thus, a major source of high cost and yield problems for active matrix LCDs is eliminated. The resolution of the display can be improved by using a focus grid to collimate electrons drawn from the microtips. Preferably, the emitter includes a carbon nanotube emitter to further reducing the device size. Further, the display may omit the liquid crystal material. Further, the field emission display does not require the S/D regions which are required by TFT for LCD. Preferably, LED source may irradiate mono color light. Namely, blue light, red light and green light LEDs are employed to act the light source. In one case, the LED may be formed in a matrix or linear configuration. Please be noted that the elements with fluorescent substances shown in FIG. 4 (carbon nanotube field emission device if the emitter is formed by carbon nano-tube) and FIG. 4 (EL) can be used as light source as well. Similarly, the light source unit can be formed by three mono-light FED (or EL) or a single FED (EL) which may emit three mono-lights. One of the reference of organic EL display may refer to U.S. Pat. No. 6,023,371, entitled "Color conversion material, and organic electroluminescent color display using the same". Please be note, laser diode maybe used as the light sources. Alternatively, the color light source unit 1100 may be composed of a laser 1100 B and a color conversion module 1100A posited on the light path of the laser.

Preferably, color conversion module 1100A may be achieved by an efficient laser wavelength conversion technology, which enables the generation and conversion of new laser wavelengths via material's nonlinearity character. Based on engineered microstructures within ferroelectric nonlinear materials, a quasi-phase-matching (QPM) is generated to compensate the phase-velocity mismatching between interaction waves for efficient wave-mixings. The QPM enables laser-based R, G, B display application. In order to achieve efficient wavelength conversion, phase matching between interaction waves are required. This has been done in nonlinear materials through birefringence phase matching techniques, which orient crystal axis to a specific angle to achieve phase matching condition for specific interaction wavelengths. U.S. Pat. No. 7,170,671, entitled "High efficiency wavelength converters" disclosed one method of the wavelength conversion. For example, the color conversion module 1100A may include waveguide with multiple grating with different periodic pattern as shown in FIG. 1B. The color conversion module may include waveguide device or bulk device. The grating could be uniform grating, multiple grating, cascade grating, fan out grating and chirped grating. The laser sequentially provides the radiation to the color conversion module 1100A, whereby converting the incident light into R, G, B, respectively.

In another embodiment, the light source of FIG. 4 includes a transparent electrode 510 on a transparent substrate 500. A fluorescent film or power 520 is attached to an upper surface of the lower transparent electrode 510. Preferably, the fluorescent substance emits color light. The present invention includes three such devices that separately emit light in red components, green components, and blue component. Each irradiates single color light. Different powder will emit different color. An upper transparent electrode 530 is formed on the fluorescent film or power 520. A second transparent substrate 540 is formed on the transparent electrode 540. A bias is applied on the electrodes to inject hole and electron, thereby exciting the fluorescent substances by the combination of the electron and hole to emit red, green, or blue visible light depending on the compound of the fluorescent substances. The elements may refer to ELP. In the examples, the light emitting device (LED) can be employed as light source as well and the mechanism and process is simpler than prior art. Preferably, LED sources that irradiate blue light, red light and green light LEDs are employed as the three mono-color light sources.

From above, the color filter wheel, high temperature white light source and a lot of lens such as condense lens are removed from the present invention. Therefore, the thermal issue, huge size and flashing effect are solved by the present invention. Furthermore, the present invention employs thin film as cold light source, no high temperature thermal issue, the lift time of the source is longer than the white light source of prior art, motor vibration noise is omitted. The poser consumption is far lower than the prior art and it may be integrated into small volume portable device.

The light having undergone switching in such a manner such as that the light has any one of the red, blue, and green colors by the color control module and travels toward the DMD panel 1200 and its luminous flux maybe calibrated by relay lens (not sown) so that the light is effectively applied to the DMD panel 1200. The light applied to the DMD panel 1200 is incident on each of the mirror elements as know in the art. The DMD 1200 receives an input signal with a gray level signal used to control an inclination of each of the mirror elements according to a gray level of each of the red, blue, and green colors represented by a video signal. The correction method and the control a state of inclination of mirror is well known in the art. Each image light is obtained by operating mirror elements of the DMD panel 1200, thereby projecting single picture element on the screen. Since switching of the color light source unit is sufficiently fast, previous light stays as an afterimage detected by human eyes and almost no case occurs in which a color looks to have been decomposed. In the present invention, the lights should be directed to the entire DMD and the present invention employs an order and sequence light color control module coupled to the light source unit for emitting different color light, sequentially. During the persistence of vision, the afterimage is thought to persist on the retina.

The present invention may be integrated into a portable device for example, cellular. FIG. 5 shows a block diagram of a portable terminal with SIM card connector 130 to carry the SIM card 135, it is well know in the art, the SIM card is not necessary for some other type of cellular such as PHS system. The diagram is used for illustrating and not used for limiting the scope of the present invention. The portable terminal or device 10 includes a RF module. As know in the art, the RF module includes antenna 105. This antenna 105 is connected to a transceiver 110, which is used to receive and transmit signal. AS know, the RF module further includes CODEC 115, DSP 120 and A/D converter as well. Due to the RF module is not the feature of the present invention, therefore, the detailed description is omitted. The present invention includes a central control IC 100, an input unit 150, a build-in display 160, OS 145, and memory 155 including a ROM program memory, a RAM memory and a nonvolatile FLASH memory. The RF module may perform the function of signal transmitting and receiving, frequency synthesizing, baseband processing and digital signal processing. The SIM card hardware interface is used for receiving a SIM card. Finally, the signal is send to the final actuators, i.e. a loudspeaker and a microphone 190.

Moreover, the portable terminal according to the present invention shown in FIG. 5 includes the projecting module 1500. An embodiment is now described with reference to FIG. 1. A projection display module 1500 is coupled to the control IC 100. The projection lens 1300 could be made up of a plurality of lenses. Thus, the data or file stored in the memory of the device can be projected on a screen or wall. It allows the user to project the image, game or file on an external screen. The EL element is small, flat form, light weight, therefore, it allows the small projection to be integrated in the portable device. Similarly, the projecting module could be integrated into a notebook, PDA, video camera, digital still camera, game player or media player.

The projector or the portable device may include a wireless transferring module 1500 coupled to the central control unit 100 for transferring data wireless and it maybe employed to transfer data between the hand-held device and an external device such as access point or computer (local or remote terminal) via network. In one embodiment, the wireless transmission module 1500 for short range refers to WLAN (wireless local area network) module. As known, the WLAN may transfer data, information between the device and the external device. Thus, the device 10 may employ the wireless transmission module 1500 to exchange data. The wireless transmission module 1500 is compatible to the WiFi, 802.11 standard (802.11a, 802.11b, 802.11g, 802.11n), Bluetooth standard or WiMax. In general, the wireless transmission module 1500 allows the device 10 couple to the internet via access point, gateway or computer. Thus, the user may download the material, data, image, game, audio, video from internet and project the download data on the screen.

Figure 6:
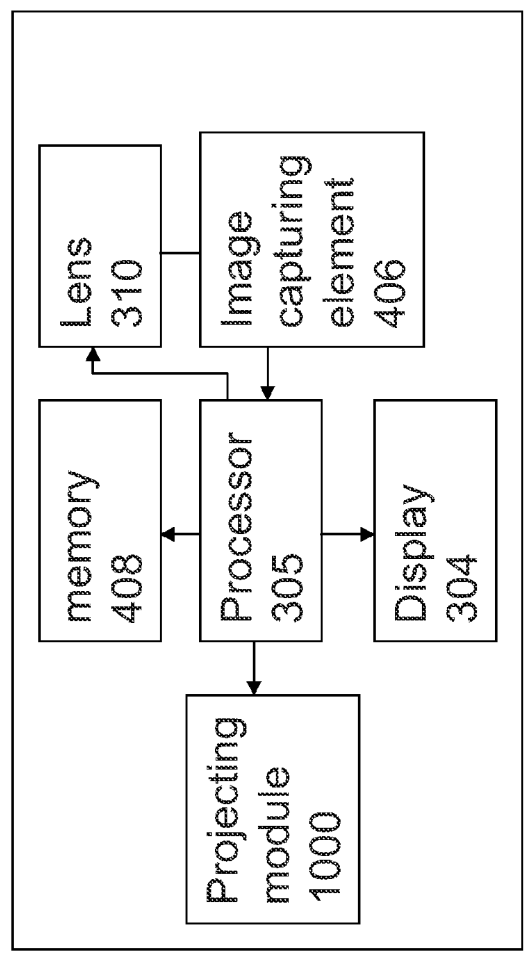
FIGS. 6 and 7 show diagrams of a image capturing device and media player with projector according to the present invention.
Figure 7:
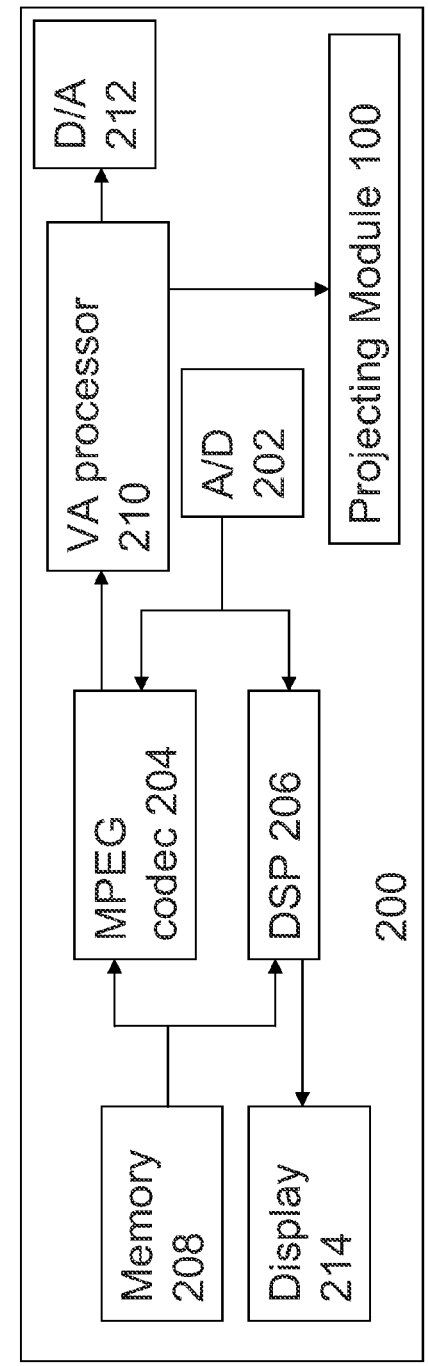

Further, referring to FIG. 6, the device includes a main body having a process 402; a display 404 formed on the main body and coupled to the processor 402; an image capture element 406 formed within the main body and coupled to the processor 402; a memory 408 coupled to the processor; a lens mechanism 310 formed on the main body, coupled to the processor 402 and corresponding to the image capture element 406; the projecting module 1000 is coupled processor of the portable device so as to project the captured image on a screen.

If the projecting module 1000 is employed for medium player such as MP3 player, MP4 player, the player includes an analog/digital (A/D) converter 202 for converting analog audio signals into digital audio signals. The analog audio signals can come from an audio source coupled to player 200. A digital signal processor (DSP) 204 or an audio and/or video driving module 206, for instance MP3, MP4 codec, are coupled to A/D converter 202 to receive the digital audio signals. In one embodiment, MP3 or MP4 codec 206 executes a firmware that includes a MPEG audio layer (e.g., MP3, MP2, or both) codec or video codec (e.g., MP4), and DSP 204 executes a firmware that includes a different type of audio codec (e.g., WMA, ACC, or both). In one embodiment, the firmware for DSP 204 also includes a video codec for encoding and decoding videos (e.g., MPEG-4 V1/V2/V3, DivX 3.11/4.0/5.0, Xvid, AVI/ASF, or any combination thereof). MP3 (or MP4) codec 206 and DSP 204 are coupled to a nonvolatile memory 208 that stores the compressed audio data. The user can select an audio file from nonvolatile memory 208. DSPs 204 and 206 are coupled to an audio processor 210, which processes the digital audio signals according to default settings or user instructions. Audio processor 210 is coupled to a digital/analog (D/A) converter 212, which converts the digital audio signals into analog audio signals for the user. A display 214 is coupled to the DSP 206.

Figure 8:
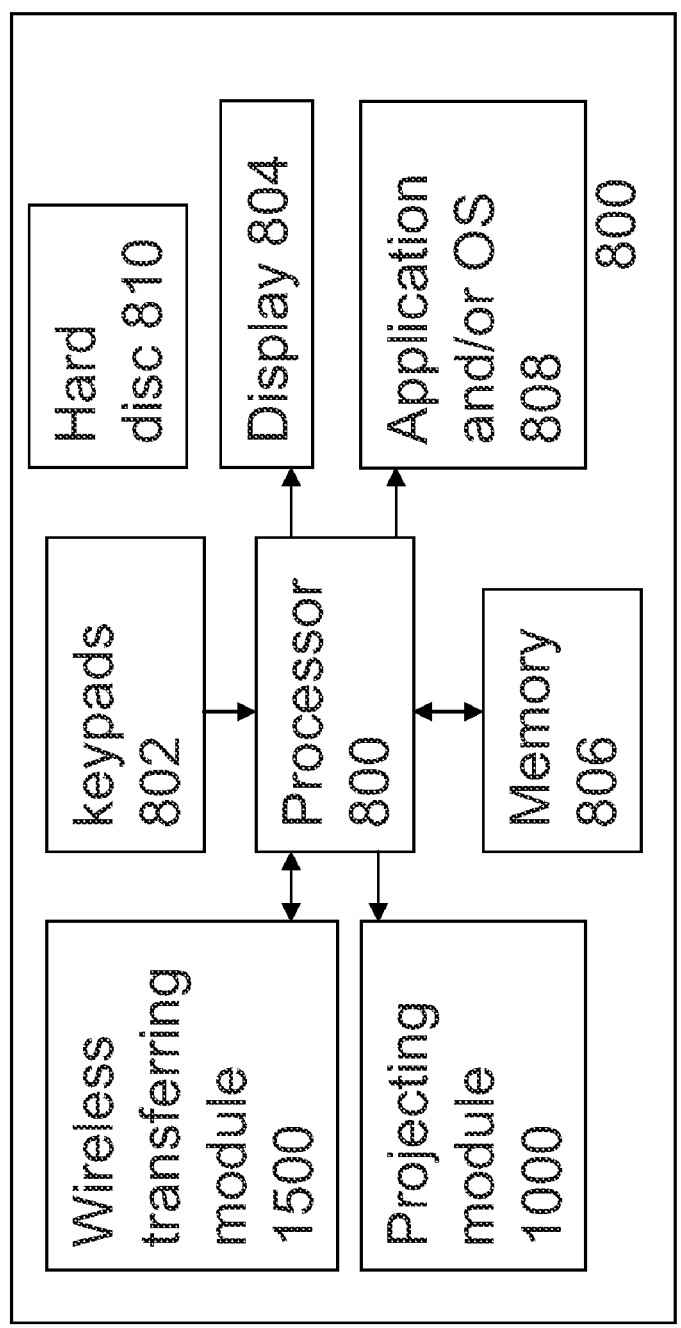
FIG. 8 shows a diagram of a computer (or notebook) with projector according to the present invention.

As shown in FIG. 8, wherein the projecting module 1000 can be integrated into the portable computer system comprises: a processor 800 formed within the portable device; a keypad 802 formed on the portable device; a display 804 coupled the processor; a memory 806 coupled to said processor 800. The device further includes an application and/or OS 808 and hard disc 810 coupled to the processor. It further includes the WLAN module 1500 and the projecting module 1000.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A filter-free projector comprising:
a light source unit to generate light beam with different color;
a sequence light color control module coupled to said light source unit for switching said light source unit to emit different color light with order and sequence;
a digital mirror device panel having a plurality of mirror elements each being controlled so as to reflect light fed from said light source unit, and said digital mirror device panel being coupled to an image signal; wherein a switching frequency of said sequence light color control module is higher than a frequency of said image signal; and
projection lens positioned in the reflected light path from said digital mirror device panel to project image.

2. The projector of claim 1, wherein said light source unit includes organic electroluminescence element to emit light of red, green, or blue.

3. The projector of claim 1, wherein said light source unit includes LED element to emit light of red, green or blue.

4. The projector of claim 1, wherein said light source unit includes field emitting element to emit light of red, green or blue.

5. The projector of claim 1, wherein said light source unit includes carbon nanotube emitting element to emit light of red, green or blue.

6. The projector of claim 1, wherein said light source unit includes electroluminescence element to emit light of red, green or blue.

7. The projector of claim 1, wherein said light source unit includes laser diode to emit light of red, green or blue.

8. The projector of claim 1, wherein said light source unit includes laser and color conversion module to emit light of red, green or blue.

9. The projector of claim 1, wherein said color conversion module includes waveguide with multiple grating with different periodic pattern.

10. The projector of claim 1, further comprising a wireless transferring module coupled to said digital mirror device panel.

11. The projector of claim 10, wherein said wireless transferring module is compatible to the WiFi, 802.11 standard (802.11a, 802.11b, 802.11g, 802.11n), Bluetooth standard or WiMax.

12. The projector of claim 1, wherein said filter free projector is embedded into a portable device including cellular, notebook, GPS, PDA, game player, media player, video camera or still camera.

13. The projector of claim 12, wherein said portable device includes a wireless transferring module that is compatible to the WiFi, 802.11 standard (802.11a, 802.11b, 802.11g, 802.11n), Bluetooth standard or WiMax.

* * * * *

UNITED STATES PATENT AND TRADEMARK OFFICE
CERTIFICATE OF CORRECTION

| | | |
|---|---|---|
| PATENT NO. | : 8,127,995 B2 | Page 1 of 1 |
| APPLICATION NO. | : 12/954687 | |
| DATED | : March 6, 2012 | |
| INVENTOR(S) | : Chiang | |

It is certified that error appears in the above-identified patent and that said Letters Patent is hereby corrected as shown below:

Title page, item (74), under "Attorney, Agent, or Firm", in Column 2, Line 1, delete "Ching" and insert -- Chih --.

Title page, item (57), under "Abstract", in Column 2, Line 3, delete "couple" and insert -- coupled --.

Column 1, line 5, delete "of a pending" and insert -- of a --.

Column 8, line 58, in Claim 12, delete "filter free" and insert -- filter-free --.

Signed and Sealed this
Twenty-fifth Day of September, 2012

David J. Kappos
*Director of the United States Patent and Trademark Office*